United States Patent Office 2,845,814
Patented Aug. 5, 1958

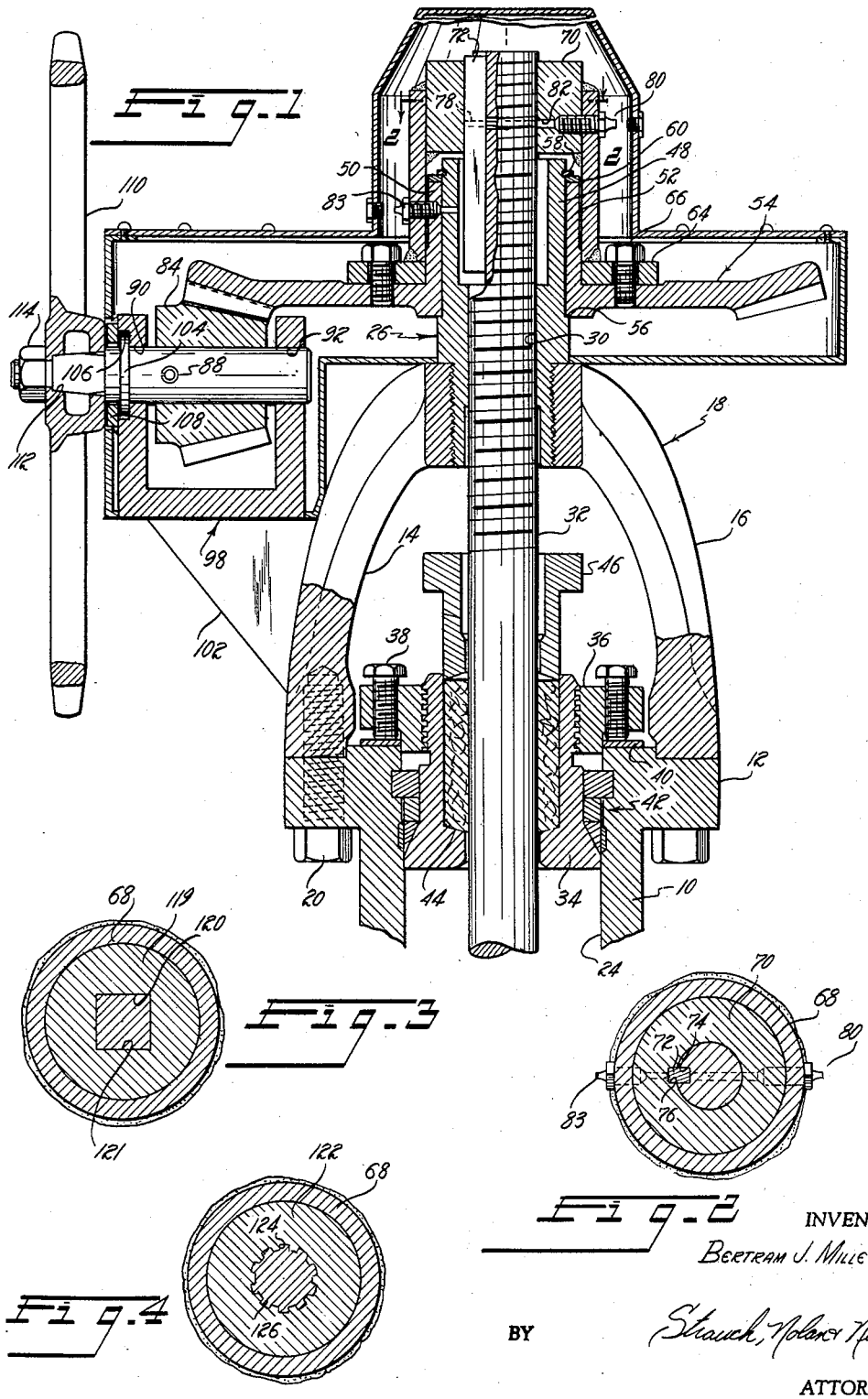

2,845,814

VALVE OPERATOR

Bertram J. Milleville, Homewood, Ill., assignor, by mesne assignments, to Edward Valves, Inc., East Chicago, Ind., a corporation of Delaware Application October 19, 1955, Serial No. 541,394

3 Claims. (Cl. 74—509)

This invention relates to valve constructions and more particularly to improved valve operators especially adapted for valves of the revolving stem type.

In valves of this type the upper end of the stem is threaded into a bushing non-rotatably mounted in a valve yoke. The stem is usually operated by a hand wheel secured directly to the upper end of the stem. Rotation of the hand wheel rotates the stem, threading the stem into or out of the yoke bushing thus moving the valve closure element toward or away from the valve seat. However, in valves of larger size the forces which can be developed conveniently through the conventional hand wheel are often insufficient to seat the closure element tightly or to break the tight seal, if it is established. In such cases it is necessary to augment the torque applied to the stem. In the past it has been proposed to interpose a gear train between the hand wheel and the stem for this purpose. Such prior devices involve departures from standard construction of the basic valve components and thus substantially increase manufacturing costs.

It is an important object of the present invention to provide improved gear operators for revolving stem valves which permit the use of the maximum number of standard valve parts thus avoiding the necessity for maintaining inventories of non-standard parts and for substantial investments needed to develop and manufacture the non-standard parts.

It is also an object of the present invention to provide novel gear operators of simple, rugged, constructon which have an extended service life.

It is a further object of the present invention to provide novel gear operators which are compactly arranged to decrease the space occupied by the valve and the operator and to facilitate the assembly of a dust cover over the usually exposed gear train.

Additonal objects and advantages will become apparent as the description proceeds in connection with the accompanying drawings in which:

Figure 1 is a fragmentary central vertical section of a valve incorporating the preferred form of the invention;

Figure 2 is a fragmentary transverse section taken along line 2—2 of Figure 1; and Figures 3 and 4 are fragmentary sections similar to Figure 2 showing modifications of the structure of Figures 1 and 2.

Referring now more particularly to the drawings, only the upper portion of the valve body 10 is shown. The remaining portion of the valve body together with the valve seat and closure member secured to the lower end of the valve stem form no part of the present invention and may take a number of forms, for example, the form shown in United States Patent No. 2,665,874.

The upper portion of the valve body 10 is of cylindrical section and is provided with a radially extending flange 12 to which the free ends of the arms 14 and 16 of the yoke indicated generally at 18 are secured by a plurality of bolts 20. In its upper portion the yoke 18 is provided with a threaded opening 22 concentric with the bore 24 of the valve body 10. The lower end of a yoke bushing 26 is threaded into the opening 22 and rigidly secured in place as by welds 28. The yoke bushing 26 is provided with a threaded bore 30 in which the threaded upper end of the valve stem 32 is received. The valve stem 32 extends downwardly through a bonnet 34 mounted in the bore 24 of the valve body 10.

A retainer ring 36 is threaded onto the bonnet 34 and a plurality of studs 38 are threaded through the retainer ring against a wear ring 40 to urge the bonnet upwardly to compress the sealing construction shown generally at 42 which may take the form shown in the aforesaid Patent No. 2,665,874. Packing 44 is compressed between the interior of the bonnet 34 and the stem 32 by a packing gland 46 which is secured to the bonnet 34 by means not shown in a manner similar to that disclosed in Patent No. 2,665,874.

Above the yoke 18 the yoke bushing 26 is provided with an integral extension 48 having an outer cylindrical surface 50 on which the hub 52 of a bevel gear indicated generally at 54 is journalled for free rotation. The lower end of the gear hub rests against a shoulder 56 formed on the yoke bushing and is retained in place on the yoke bushing by a retaining ring 58 which bears against a wear ring 60 on the upper end of the ring gear hub 52.

A connector assembly indicated generally at 62 effectively fixes the ring gear 54 and the valve stem 32 against relative rotation while permitting free axial displacement of the stem through the connector assembly.

The connector assembly includes a ring 64 non-rotatably secured to the bevel gear 54 adjacent the hub 52 by bolts 66. A sleeve 68 is welded at its lower end to the ring 64 and at its upper end, which projects above the upper end of the bushing 26, is welded to an annular fitting 70. As shown in Figure 2 the fitting 70 has a central bore slightly larger than the diameter of the threaded upper end of the stem 32 which it surrounds. A key 72 fitted within keyways 74 and 76, respectively, in the stem 32 and the fitting 70, is held in position against axial movement with respect to the valve stem by a pin 78. Accordingly, the stem and the fitting 70 are locked against relative rotation while the stem and key 72 may move freely axially through the fitting 70. To promote the free axial movement of the stem through the fitting 70 the parts are lubricated through a standard lubricating fitting 80 mounted in the sleeve 68 and connecting with a passage 82 leading to the interior of the fitting 70. An additional fitting 83 is provided to lubricate the hub 52 of gear 54.

The gear 54 is driven by a pinion 84 non-rotatably secured to a hand wheel shaft 86 by a pin 88. The shaft 86 is journalled in spaced aligned bores 90 and 92 formed in the respective arms 94 and 96 of the U-shaped bracket indicated generally at 98 welded to a triangular adapter plate 102 of inexpensive construction welded to the arm 14 of the yoke. The straddle mounting of the pinion increases the rigidity of the assembly as compared to conventional cantilevered mounting and permits the use of relatively small lightweight supporting members. Endwise movement of the shaft 86 is prevented by a collar 104 on the shaft 86 which is received in an annular recess 106 in the arm 94 of the bracket assembly 98 and is held in the recess by a ring 108 welded to the outer face of the bracket arm 94. Outwardly of the ring 108 a handwheel 110, having a square or splined hub 112, is mounted on a portion of the shaft 86 having a similar section and is held in place by a nut 114 threaded on the outer end of the shaft 86.

Accordingly, rotation of the hand wheel 110 produces rotation of the pinion 84, the bevel gear assembly 54, the connector assembly 62 and the stem 32 thus raising or lowering the stem depending upon the direction of rotation. No modifications of the standard yoke assembly are required to accommodate the gear operator and a standard yoke assembly may be stocked both for valves of standard construction and valves employing the novel gear operator of the present invention. Further since the bevel gear 54 is provided with downwardly facing teeth the pinion is straddle mounted substantially entirely underneath the gear 54 thus producing a compact assembly. The assembly is preferably enclosed by a dust cover assembly comprising an annular body portion 115 to which a cover 116 is secured by screws 117. The cover 116 is provided with grease fitting access plugs 118 for the fittings 80 and 83.

It will be apparent that other forms of connection between the sleeve fitting 70 and the stem may be employed to provide the required lock against relative rotation but to permit relative axial movement of the components. Two such modifications are shown in Figures 3 and 4. In the construction of Figure 3 the sleeve fitting 119, which replaces the fitting 70 in Figure 1, is provided with a square central opening 120 which receives the squared upper end 121 of the stem which in other respects is identical with the stem 32 of Figure 1.

In the construction of Figure 4 the sleeve fitting 122 which replaces the fitting 70 of Figure 1 is provided with internal splines 124 which engage splines 126 formed in the upper end of the stem.

Except for the alteration in the connection between the stem 32 and the connector assembly 62 the modifications of Figures 3 and 4 are identical with the form of the invention shown in Figure 1.

It will be apparent from the foregoing that the above stated objects of the invention have been accomplished by the provision of a simple, rugged, compact gear operator assembly which may be readily installed on valves of essentially conventional construction.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a valve having a yoke and a stem threaded into a relatively stationary bushing mounted in said yoke and projecting above said bushing, said bushing having a substantially cylindrical section extending above said yoke; a drive gear having an elongated hub journalled on said cylindrical section of said bushing; means fixing said hub against movement axially of said bushing; a sleeve rigid with said drive gear and extending upwardly to a point adjacent the projecting end of said valve stem; means fixing said sleeve and said stem against relative rotation while permitting axial movement of said stem through said sleeve; and a handwheel operated pinion mounted on said yoke in meshing engagement with said drive gear.

2. In a valve having a yoke and a stem threaded into a relatively stationary bushing mounted in said yoke and projecting above said bushing, said bushing having a substantially cylindrical section extending above said yoke; a drive gear having an elongated hub journalled on the cylindrical section of said bushing; means fixing said hub against movement axially of said bushing; a sleeve rigid with said drive gear and extending upwardly to a point adjacent the projecting end of said valve stem; means fixing said sleeve and said stem against relative rotation while permitting axial movement of said stem through said sleeve; a bracket rigid with said yoke and having spaced aligned journals; a handwheel mounted on a shaft rotatably supported in said journals; and a pinion non-rotatably supported on said shaft between said journals in meshing engagement with said drive gear.

3. The valve according to claim 2 wherein said drive gear has downwardly facing teeth and said pinion is mounted substantially entirely underneath said drive gear to provide a compact assembly.

References Cited in the file of this patent
UNITED STATES PATENTS

| | | |
|---|---|---|
| 1,317,298 | Hoyt | Sept. 30, 1919 |
| 1,412,058 | Johnson | Apr. 11, 1922 |
| 1,482,838 | Casale et al. | Feb. 5, 1924 |
| 1,966,209 | Miller | July 10, 1934 |
| 2,452,428 | Bryant | Oct. 26, 1948 |